Sept. 5, 1944.     C. T. PEACOCK     2,357,760

SEEDER

Filed Nov. 3, 1942

INVENTOR.
CHARLES T. PEACOCK
BY Martin E. Anderson
ATTORNEY.

Patented Sept. 5, 1944

2,357,760

UNITED STATES PATENT OFFICE 2,357,760

SEEDER

Charles T. Peacock, Lincoln County, Colo.

Application November 3, 1942, Serial No. 464,343

2 Claims. (Cl. 111—85)

This invention relates to improvements in seeders of the type employed in connection with listers and which are so constructed that they sow two rows of seed at the bottom of each lister furrow.

In many parts of the country, and especially in the semi-arid regions, lister cultivation is quite common and the seed, for example wheat, is sowed near the bottom of the lister furrows in rows spaced about seven inches apart in the side walls of the trenches.

The usual lister seeder is provided with shoe type seed groove openers that project straight downwardly and deposit the seed in the two rows mentioned. It has been found that in the semi-arid regions the grooves in which the seed has been deposited will fill with dry ash-like dust from the side of the furrow wall, and this dry soil delays, and some times even prevents, the proper germination of the seed.

It is the object of this invention to produce a seeder of the type mentioned in which the seed instead of being deposited in vertical seed grooves, will be deposited in inwardly inclined seed grooves cut in the side walls of the lister furrow, of such shape that after the seed groove opener or shoe has passed, and the seed has been deposited, the upper wall of the seed groove will fall downwardly onto the seed, thereby placing the seed in contact both at the bottom and top with moist soil instead of covering the seed with dry powdery dust as now happens.

Another object of this invention is to produce a seeder having seed groove openers or seed shoes of such construction and so positioned that the seed, when it falls, will be deposited directly onto the bottoms of the seed grooves cut in the side walls of the furrow, and thereby eliminate the danger of clogging the seed shoe as some times happens with present equipment.

A still further object is to produce a method of seeding that shall be especially well adapted to semi-arid regions and which will produce a greater percentage of germination than can be obtained from ordinary seeding methods.

Having thus briefly described the objects of the invention and in a general way indicated the form of apparatus, the latter will now be described in detail and for this purpose reference will be had to the accompanying drawing in which a seeder constructed in accordance with this invention has been illustrated, and in which.

Figure 1:
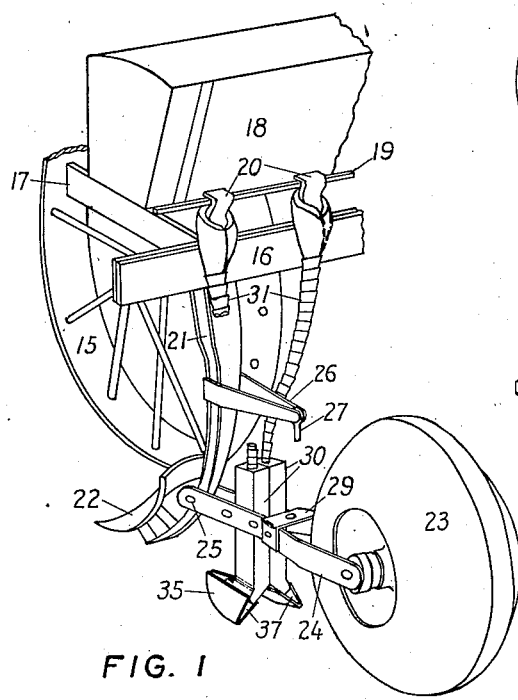
Figure 1 is a perspective view showing one end portion of an ordinary lister seeder which is constructed in accordance with this invention.

In the drawing reference numeral 15 designates one of the wheels of a lister seeder on which the frame comprising members 16 and 17 is supported. A seed box 18 is supported by the frame in the manner shown.

Such seeders are provided with means for feeding a predetermined quantity of seed per unit length of ground traversed and in the embodiment the shaft 19 and the parts indicated by reference numeral 20 represent this feed mechanism. The shaft 19 is rotated from the wheels 15 in the usual manner, but this rotating means has not been shown as it forms no part of this invention.

Reference numeral 21 designates a beam of which there are several connected with each seeder, only one being shown in Figure 1. Secured to the lower end of the beam is a shovel 22 that opens the seed furrow or trench.

A presser wheel 23 is mounted for rotation between the rear ends of the spaced bars 24 whose forward ends are pivotally connected with the beam by means of a suitable bolt 25. Two rearwardly extending brackets 26 are secured to the beam some distance above the pivot bolt 25 and secured between the rear ends of these brackets is a rod 27. A spring 28 encircles the rod and these parts are so adjusted as to produce a downward pressure on the transverse bar 29. The mechanism comprising parts 26 to 29 is old and well known and has therefore been more or less diagrammatically illustrated in the drawing. Secured to the inner surfaces of the bars 24 are two feed tubes which have been designated by reference numeral 30. Feed tubes 30 correspond to the ordinary feed tubes and furrow opening shoes employed on lister seeders, but differ from the latter in several particulars, the most important of which is that instead of extending straight downwardly they flare outwardly so as to deposit the seed in the side walls of the lister furrows instead of in the bottom as is now the customary way.

Flexible tubes 31 serve to conduct the grains from the seed mechanism 20 to the feed tubes 30 in the usual manner.

At this point attention will be directed to the important structural feature, namely, that the seed tubes 30 are placed between the two bars 24 instead of on the outside as is now common.

The pressure wheel 23 is so positioned that it contacts the soil between the two seed tubes.

Figure 2:
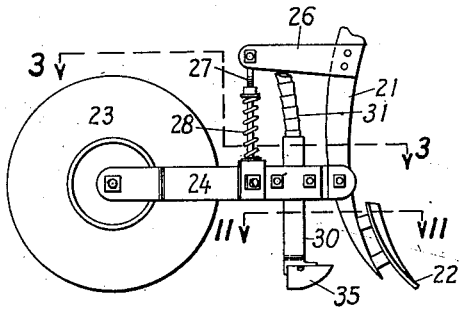
Figure 2 is a side elevation of a portion of a lister seeder of a similar construction, but in which the parts have been illustrated in a more or less diagrammatic manner.
Figure 3:
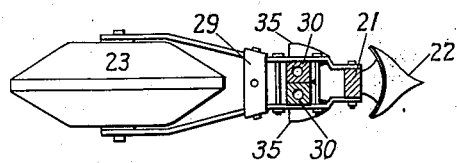
Figure 3 is a section taken on line 3—3, Figure 2.

In Figures 2 and 3 the apparatus has been shown in a somewhat diagrammatic manner and from these views the important structural characteristics will be apparent.

Figures 4, 5:
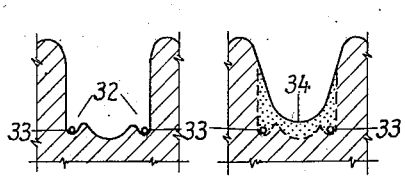
Figure 4 is a section through a portion of a field showing the seed furrows as they ordinarily appear after the seed has been planted by the ordinary lister seeder.
Figure 5 is a section similar to that shown in Figure 4 and shows the manner in which the seeds are covered by dry soil falling downwardly from the sides of the furrow.

The manner in which this seeder functions as distinguished from the ordinary seeder of this type can be best understood and most readily explained when reference is had to Figures 4, 5, 6 and 7. In Figure 4, a lister furrow has been shown in which seed grooves 32 have been opened by the ordinary seed shoes and the seed 33 deposited in the bottoms of these grooves. Since there is always more or less dry soil clinging to the sides of the furrows, the seed grooves will be filled with dry powdery soils like that indicated by reference numeral 34, in Figure 5. This dry soil has a drying effect on the moister soil on which the seeds rest and since it is often times in an ashy condition, it is obvious that the seeds are deprived of the necessary moisture to effect quick and satisfactory germination. Seeds sown by seeders that permit dry powdery soil to cover the seed do not germinate as fast nor to as great a percentage as they would if they were subjected to the action of sufficient moisture. Even where there has been no rain for a long period, as often happens in the semi-arid regions, there is some moisture in the soil and if this moist soil is brought into contact with the seeds, a more complete germination and a quicker growth will result.

Figure 6:
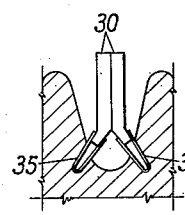
Figure 6 is a section similar to those shown in Figures 4 and 5, but shows the seeds deposited in grooves cut in the sides of the furrow by means of seeder shoes that form part of my present invention.
Figure 7:
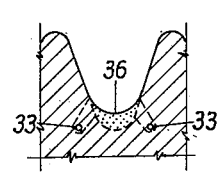
Figure 7 is a section similar to that shown in Figure 6 and shows how the seeder groove has collapsed and covered the seed in such a way as to protect it from contact with the dry dust-like soil.

Referring now to Figures 6 and 7, the seed tubes 30 have been indicated in a diagrammatic manner and from this it will be seen that the lower ends of the tubes curve outwardly and terminate in shoes 35, which penetrate the side walls of the furrow. The seeds are deposited on the bottom of the groove opened by the improved seed shoes and after these have passed, the soil above the seed falls down onto the latter and embeds them in this moist soil. The dry soil that falls from the top and sides of the furrow accumulates in the bottom as indicated by reference numeral 36 in Figure 7. It will be seen that by depositing the seeds in outwardly inclined grooves cut in the side walls of the furrow, that automatically collapse when the seed shoes advance the dry powdery soil is prevented from entering the grooves and at the same time the seeds are entirely enclosed in the moister portions of the soil. The pressure wheel which acts on the dry soil 36, forms a bottom which often times results in a hard crust after heavy rains, but when the seed is planted in the sides of the furrows, the sprouts will extend upwardly beyond the hardened crust and will therefore not be held back and killed, due to their inability to penetrate, as often happens with other methods of seeding.

Figure 8:
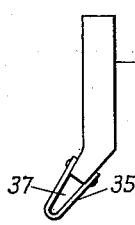
Figure 8 is a rear view of my seeder shoe.
Figure 9:
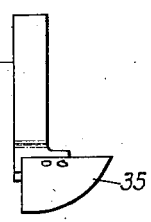
Figure 9 is a side elevation looking in the direction of arrow 9, Figure 8.
Figure 10:
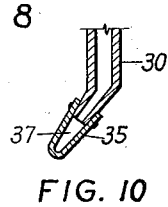
Figure 10 is a section taken on line 10—10, Figure 9.

Referring now to Figures 8, 9 and 10, it will be seen that the seed tubes are formed with outwardly projecting hollow portions or shoes that serve to cut grooves in the side walls. The rear wall is cut away as indicated by reference numeral 37 so that the seed will be left undisturbed on the bottom until the groove wall collapses and covers them. In Figure 10, which is in section, the curved tubular opening has been shown and from this it will be apparent that the seeds have a practically free path until they reach the soil below and this removes the danger of clogging.

Figures 11, 12:
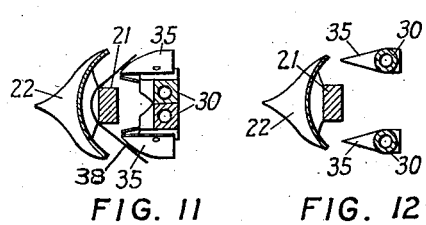
Figure 11 is a transverse section taken substantially on line 11—11, Figure 2.
Figure 12 is a section similar to that shown in Figure 11, but shows the seed shoes spaced in the ordinary manner.

In Figures 11 and 12, a comparison has been made between the ordinary spaced seed tube construction, which is shown in Figure 12, and that which is in accordance with my invention and which has been illustrated in Figure 11. It will be seen that the seed tubes 30 in Figure 12 are spaced a considerable distance apart with the result that they catch straw and weeds and very soon accumulate large loads which must be cleared; whereas, with my improved construction, shown in Figure 11, the tubes are positioned close together so as to decrease the width and when desired an "A" type shield 38 can be provided in front of the beam 21 and this serves to direct weeds and straw to the sides and helps greatly to prevent accumulation of the latter. The shield is also effective to keep the powdery dry soil from falling into the trench as the seeding progresses, assuring that the furrows opened by the seed tubes will have ample time to close and cover the seeds before the dry powdery soil enters the trench.

Attention is called to the fact that the shape of the seed tubes has been shown in a more or less diagrammatic manner and such changes in form as may be indicated can be made without departing from the invention. The principal feature, as above mentioned, is that the tubes project outwardly so as to deposit the seed in grooves whose upper walls are almost horizontal and which will therefore collapse when deprived of the support of the tubes, thereby embedding the seeds in moist soil and sealing the grooves against the entry of dry powdery soil.

Having described the invention what is claimed as new is:

1. A seeder for depositing a row of seed in each side of a lister furrow, having upwardly flaring sides, comprising a beam, a furrow opening tool thereon, a presser wheel frame attached at its front end to the beam, for oscillation about a horizontal pivot, said frame comprising two spaced side members, a presser wheel mounted for rotation between the free rear ends of the side members, the distance between the side members between the beam and the periphery of the presser wheel being less than the width of the furrow forming tool, and a tubular seed tube positioned between the side members, between the furrow opening tool and the presser wheel, means for securing the tube in position between the side members, the end of the tube below the side members being outwardly and downwardly inclined, terminating at a point outside of the corresponding side of the furrow forming tool, whereby it will project into the wall of the furrow and deposit the seed in a seed groove that will collapse and enclose the seed in freshly cut soil.

2. A seeder for depositing a row of seed in each side of a lister furrow, having upwardly flaring sides, comprising a beam, a furrow opening tool thereon, a presser wheel frame attached at its front end to the beam, for oscillation about a horizontal pivot, said frame comprising two spaced side members, a presser wheel mounted for rotation between the free rear ends of the side members and a tubular seed tube connected with the side members, between the furrow opening tool and the presser wheel, the end of the tube below the side members being outwardly and downwardly inclined, terminating at a point outside of the corresponding side of the furrow forming tool, whereby it will project into the wall of the furrow and deposit the seed in a seed groove that will collapse and enclose the seed in freshly cut soil.

CHARLES T. PEACOCK.